June 19, 1951 A. N. GOLDSMITH 2,557,278
SIGNAL TRANSMISSION SYSTEM
Filed July 25, 1946
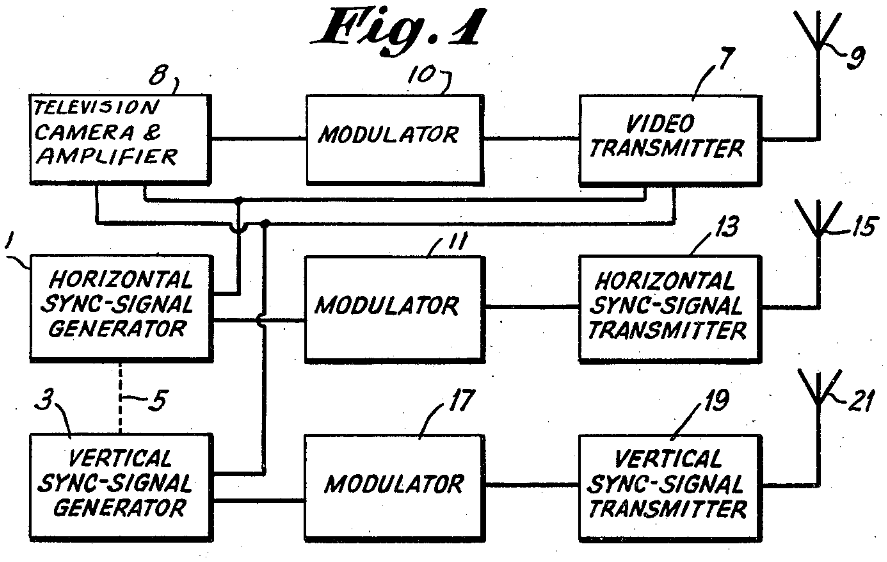
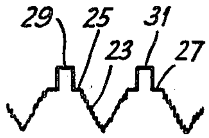
Fig. 2
Fig. 3
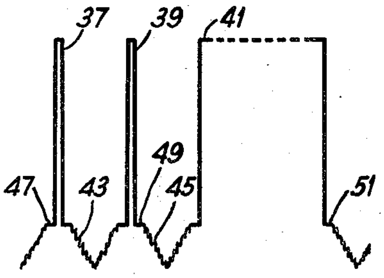
Fig. 4
INVENTOR
ALFRED N. GOLDSMITH
BY W. S. Grover.
ATTORNEY Patented June 19, 1951 2,557,278

UNITED STATES PATENT OFFICE 2,557,278

SIGNAL TRANSMISSION SYSTEM

Alfred N. Goldsmith, New York, N. Y., assignor to Radio Corporation of America, New York, N. Y., a corporation of Delaware Application July 25, 1946, Serial No. 686,185

5 Claims. (Cl. 250—17)

This invention relates to methods and means for the efficient transmission and improved reception of any composite signal or other form of energy transmission, one portion of which, at least, may consist of brief energy impulses or surges occurring at time intervals which are widely spaced in time in comparison to the impulse duration.

According to a preferred form of this invention, there is located at the originating or transmitting point a plurality of signal generators, which are each adapted to normal signal transmission of different types.

The quasi-continuous portion of the composite signal is transmitted from an ordinary modulatable transmitter of the type conventionally used therefor, the impulsive or indicial-signal portion of the energy transmission or composite signal by means of an impulse transmitter which is suitably power rated for the purpose, and the transmissions are combined in separate or conjoint antenna systems or other terminal transmitting equipment to form the composite transmitted signal.

Certain forms of electrical energy transmission or signaling consist, at least in part, of portions having the following characteristics:

1. A portion wherein the flow of energy approaches continuity with relatively brief interruptions therein and with an average amplitude of the same order of magnitude as the major portion of the instantaneous amplitudes. Otherwise stated, the R. M. S. value of such energy is of the same order of magnitude as its maximum amplitude or average amplitude. Examples of such signals are telephone signals, the video portion of television signals, the audio portion of telephone signals, ordinary telegraph signals, and the like. In telemetering or radio dynamic control, relatively continuous indications or signals corresponding thereto would also, in general, fall into this class, provided the indications were substantially continuous.

2. A portion wherein the flow of energy is highly discontinuous, abrupt, or in the nature of surges or impulses. Such energy flow is distinguished by the fact that the energy values are small or zero for the major portion of the time and are large for brief portions of the time; that the duration of the energy transmissions is small compared to the time intervening between them; and that the R. M. S. value of the energy is small compared to the peak value of the energy surges. Examples of such energy transmissions are brief timing impulses, the impulses sent out by radar transmitters, television line and field synchronizing signals, facsimile line synchronizing signals, and other forms of impulse transmissions in which the impulses are relatively widely separated.

As indicated above, this invention is applicable to systems wherein a composite signal exists having within itself portions of the type of 1 above and other portions of the type of 2 above. As a general rule, such systems are contrived so that the frequency band required for the effective transmission of each of the portions thereof are reasonably closely alike.

The primary object of this invention is to provide an improved signal transmission system.

Another object of this invention is to provide an improved television transmission system.

Still another object of this invention is to increase the effectiveness of transmission and reception of the impulsive portions of composite signals.

Another object of the invention is to utilize appropriately for each portion of a composite transmission, including both types 1 and 2 transmission as described above, a separate transmitter adapted to function effectively and economically for its corresponding portion of the composite transmission.

A further object of this invention is to minimize the required power rating of the transmitter which sends out the quasi-continuous portions of the composite signal.

A still further object of this invention is to increase, if desired, the amplitude of the impulsive portion of the composite signal as compared to the average or peak amplitude of the quasi-continuous portion of the composite signal.

Other and incidental objects of the invention will be apparent to those skilled in the art from a reading of the following specification and an inspection of the accompanying drawing in which Figure 1 shows schematically this invention in one of its preferred forms; and Figures 2, 3, and 4 show graphically signals of the type for which this invention is particularly applicable.

Figure 1 illustrates schematically the employment of this invention for the transmission of television signals. The horizontal and vertical synchronizing signal generators 1 and 3 are interlocked as indicated by 5. Portions of the output of generators 1 and 3 pass to the video transmitter 7 for camera control purposes but not for transmission through radiating antenna 9. The video transmitter 7 is furnished image signals by television camera and amplifier 8 through the modulator 10. The television camera and amplifier 8 and the modulator 10 may take any of the well known forms such as described or referred to in the book entitled "Principles of Television Engineering," by Donald G. Fink, published by McGraw-Hill Book Co. in 1940. It is believed that such elements are quite well known and adequately described in the television art at this time. It is important to note, however, that although connections are made between the horizontal and vertical sync signal generators 1 and 3 with the video transmitter 7, only blanking information is employed in the video transmitter 7. The video transmitter 7 does not send the synchronizing signals. The horizontal synchronizing signal generator 1 controls the modulator 11 which, in turn, acts upon or triggers the impulsive horizontal or line synchronizing signal transmitter 13, the output of which passes to the radiating antenna 15. Transmitter 13 sends only the horizontal or line synchronizing signal.

The vertical or field (or frame) synchronizing signal generator 3 controls modulator 17, and this modulator 17 in turn controls or triggers the impulsive vertical synchronizing signal transmitter 19, the output of which passes to radiating antenna 21.

The three antennas 9, 15, and 21 may be either one and the same antenna suitably used for the three signals, or they may be three separate antennas. If they are separate antennas, their directive radiation patterns should be so selected that they will produce appropriately cooperative signals at the receiving points of all their signals.

The power rating of the impulse transmitters 13 and 19 is suitably chosen to provide a most efficient system. It is well known that the surge amplitude or power may be extremely high as compared to the continuous rating of the transmitter in which it originates. Thus, if a transmitter sends out brief impulses which are relatively widely separated, as compared to their duration, the power radiated during the impulse periods will be tens or even hundreds of times greater than the continuous rating of the transmitter. The physical reasons for this improved rating, in an appropriately designed and utilized transmitter, need not be here given.

The economy due to the use of an impulsive type of transmitter may be either in creating greater amplitude of the impulse signal such as, for example, the synchronizing signals in a television transmission or diminishing the duration of such impulsive signals and thereby giving greater accuracy of timing or synchronizing. Another possible advantage may be in diminishing the requisite transmitter rating.

Impulsive signals may nevertheless be identifiable in a variety of fashions. That is, their structure or even their internal "fine structure" may be appropriately selected. In general, such impulsive signals, such as synchronizing signals in television, may be identified by their amplitude, their duration, other characteristics such as superimposed amplitude variations within or during their duration, phase or time shifts, or by combinations of the preceding.

Reference has been made in the preceding to the use of an impulsive transmitter, this being a type of transmitter particularly adapted by its construction and rating to send out energy surges or impulses of relatively high amplitude, as compared to the quasi-continuous component which is therewith associated in the composite signal.

There will not be described herein the particular circuit arrangements used in impulse transmitters, since these are well understood in the arts (e. g., impulse radar systems) wherein such transmitters are normally employed. Broadly, such impulse transmitters may be classified for the purpose of this invention as follows:

1. A primarily conventional transmitter which is operated far above its normal continuous rating during the surge periods only and is substantially quiescent between such surge periods, and which is not provided with any special energy-storage means.

2. A transmitter which is particularly designed to withstand extremely high momentary overloads and which is, in addition, provided with energy-storage means active in the storage of energy between the surges and releasing their stored energy during the surges (e. g., a suitable capacitor) and which is accordingly rated far beyond the continuous capacity of such a transmitter.

Referring now to Figure 2, there is shown schematically a portion of a television signal including slightly more than one line. 23 is the video signal. 25 and 27 are the pedestals. 29 and 31 are line synchronizing signals. The approximate relationship of amplitudes is indicated in Figure 2.

Figure 3 similarly indicates a field synchronizing signal 33 which occurs at the end of a field, as well as the first line-synchronizing signal thereafter, namely 35. The fine structure of the field synchronizing signal 33 is not shown in Figure 3, but may be of whatever nature is found suitable for the particular system which is adopted. This invention is applicable to any internal fine structure of either the line or field synchronizing signal.

In Figure 4 there is shown another type of composite-signal wave wherein the vertical and horizontal synchronizing signal is relatively high as compared to the amplitudes of the video signals or the therein included pedestals. The signal shown in Figure 4 differs from Figure 2 and Figure 3 primarily in that the amplitudes of the synchronizing signals 37, 39, and 41 are distinctly greater in proportion to the video signals 43 or 45 or the therewith related pedestals 47, 49 and 51. It should be noted that the duration of the synchronizing signals may also be diminished as compared to those in Figures 2 and 3, and this has been shown in the case of the line synchronizing signals 37 and 39. It should further be noted that, while there are indicated in Figure 4 line and field synchronizing signals of equal amplitude, this is not a necessary condition. In fact, there are certain advantages in having the field synchronizing signal amplitude less than that of the line synchronizing signal inasmuch as the duration of the field synchronizing signal is relatively greater.

For the purpose of explanation, it will be assumed that the pedestals 25 and 27 of Figure 2 under the synchronizing signals are either omitted altogether or are included as a part of the quasi-continuous video signal itself. The synchronizing signals 29 and 31 of Figure 2 and 33 of Figure 3, being of essentially impulsive nature, are handled by an impulse transmitter. Thus the video signals 23 of Figure 2, with or without the pedestal portions of the signal, but excluding the synchronized signal, are sent out by a conventionally rated transmitter, whereas the synchronizing signals are sent out by at least one impulsive transmitter, such as transmitter 19 of Figure 1. Alternatively, the synchronizing signals may be sent out by two impulse transmitters, one impulse transmitter 13 being adapted to send out the line synchronizing signal and the other transmitter 19 to send out the field synchronizing signals.

As illustrative of this invention, the following discussion will be applied specifically to the particular form of composite signal which has been established as standard by the Radio Manufacturers Association for the transmission of images by television. The nature of this type of signal is shown and described in detail in a book by D. G. Fink entitled "Principles of Television Engineering," pages 170, 171, published by the McGraw-Hill Book Company, New York, N. Y., 1940.

Examination of the composite signal train indicates that the length of the horizontal synchronizing signal is $(0.07 \text{ plus } 2\times0.005)\text{H}$ or approximately 0.08 H. This duration amounts to 5 microseconds for the horizontal synchronizing impulses on a 525-line picture wherein H equals 1/15750th of a second or 63.5 microseconds.

It must be remembered that such high intensity synchronizing signals as may be provided by the practice of this invention can be much shortened in duration, subject to the limitations of the available frequency band, and that therefore a duration of 5 microseconds for such signals represents their maximum duration. Further, they need not be of rectangular outline or wave form.

Passing to the vertical synchronizing signal, the duration of this is seen to be 22 H or 1397 microseconds as a maximum. They are separated by 240.5 H intervals. Here again, it may prove desirable in view of the large amplitude that will be available for the vertical synchronizing signals to shorten their duration.

It has been pointed out that the period between impulses in an impulse transmitter is long compared to the duration of the impulses. If a separate impulse transmitter is used for the horizontal synchronizing signals only, the ratio of the quiescent (non-transmitting) period to the transmitting period is (1.00 minus 0.07) H/0.07H or approximately 13-to-1. Similarly, the corresponding ratio for the vertical synchronizing signal, assumed to be carried on a separate impulsive transmitter, is (262.5 minus 22) H/22H or approximately 11-to-1. This indicates that the improvement in rating of the synchronizing signal transmitters might lie in the range between 10-to-1 and 100-to-1. The nature of the synchronizing signal is naturally involved in the exact ratio which may later be determined, partly experimentally.

Having thus described my invention, what is claimed is:

1. A television signal transmission system comprising in combination a horizontal synchronizing signal generator, a vertical synchronizing signal generator, and a source of image signals, a signal transmitter, including a modulator and a carrier signal amplifier connected to said horizontal synchronizing signal generator and adapted to transmit horizontal synchronizing pulses only, a second signal transmitter, including a modulator and a carrier signal amplifier connected to said vertical synchronizing signal generator and adapted to transmit vertical synchronizing pulses only, and a third signal transmitter, including a modulator and carrier signal amplifier, connected to said source of image signals and adapted to transmit only said image signals.

2. A television signal transmission system comprising in combination a horizontal synchronizing signal generator, a vertical synchronizing signal generator, and a source of image signals, a signal transmitter connected to said horizontal synchronizing signal generator, a second signal transmitter connected to said vertical synchronizing signal generator, and a third signal transmitter connected to said source of image signals and adapted to transmit only said image signals.

3. A television signal transmission system comprising in combination a horizontal synchronizing signal generator, a vertical synchronizing signal generator, and a source of image signals, a signal transmitter, including a modulator, a carrier signal amplifier, and an associated antenna system, connected to said horizontal synchronizing signal generator, a second signal transmitter, including a modulator, a carrier signal amplifier, and an associated antenna system, connected to said vertical synchronizing signal generator, and a third signal transmitter, including a modulator, a carrier signal amplifier, and an associated antenna system, connected to said source of image signals and adapted to transmit only said image signals.

4. A system for the transmission of signals bearing a cooperative timed relation to each other including pulse signals and intelligence signals in which said pulse signals are of substantially higher peak power than said intelligence signals, comprising in combination a modulated radiant energy transmitter having an input circuit to receive only said intelligence signals, and at least one impulse type radiant energy transmitter having an input circuit to receive only said pulse signals, and wherein said impulse type radiant energy transmitter transmits said pulse signals at such a high peak power level that continuous operation at said level would overload said impulse type radiant energy transmitter.

5. A television signal transmission system comprising in combination a source of synchronizing pulses and an associated source of image signals, an impulse radiant energy transmitter connected to transmit said synchronizing signals and arranged to transmit energy only at the time of said synchronizing pulses, said impulse radiant energy transmitter adapted to transmit energy of such a magnitude that it would be overloaded if such a degree of energy were radiated continuously, and a radiant energy transmitter connected to transmit only said image signals.

ALFRED N. GOLDSMITH.

REFERENCES CITED

The following references are of record in the file of this patent:

UNITED STATES PATENTS

| Number | Name | Date |
|---|---|---|
| 2,191,796 | Lewis | Feb. 27, 1940 |
| 2,236,501 | Goldsmith | Apr. 1, 1941 |
| 2,310,197 | Hansell | Feb. 2, 1943 |
| 2,402,091 | Schade | June 11, 1946 |
| 2,403,549 | Poch | July 9, 1946 |
| 2,407,199 | Wolff | Sept. 3, 1946 |
| 2,414,453 | De France | Jan. 21, 1947 |

FOREIGN PATENTS

| Number | Country | Date |
|---|---|---|
| 392,729 | Great Britain | May 25, 1933 |